(12) United States Patent
Hartmann

(10) Patent No.: US 12,104,732 B2
(45) Date of Patent: Oct. 1, 2024

(54) PLUG-IN CONNECTOR FOR CONNECTING PIPES FOR LIQUID OR GASEOUS MEDIA

(71) Applicant: HENN GMBH & CO KG., Dornbirn (AT)

(72) Inventor: Harald Hartmann, Dornbirn (AT)

(73) Assignee: HENN GMBH & CO KG, Dornbirn (AT)

( * ) Notice: Subject to any disclaimer, the term of this patent is extended or adjusted under 35 U.S.C. 154(b) by 23 days.

(21) Appl. No.: 17/927,401

(22) PCT Filed: May 27, 2021

(86) PCT No.: PCT/AT2021/060181
§ 371 (c)(1),
(2) Date: Nov. 23, 2022

(87) PCT Pub. No.: WO2021/237261
PCT Pub. Date: Dec. 2, 2021

(65) Prior Publication Data
US 2023/0213126 A1    Jul. 6, 2023

(30) Foreign Application Priority Data

May 27, 2020 (AT) .............................. A 50461/2020

(51) Int. Cl.
*F16L 37/12*    (2006.01)

(52) U.S. Cl.
CPC ....... *F16L 37/1225* (2013.01); *F16L 2201/10* (2013.01)

(58) Field of Classification Search
CPC ... F16L 37/1225; F16L 37/12; F16L 37/1205; F16L 37/133; F16L 37/14; F16L 37/142;
(Continued)

(56) References Cited

U.S. PATENT DOCUMENTS 6,089,616 A    7/2000  Trede et al.
8,336,919 B2   12/2012 Gillet
(Continued)

FOREIGN PATENT DOCUMENTS

DE    202012102296 U1    7/2012
EP    2251581 A1    11/2010
(Continued)

OTHER PUBLICATIONS

International Search Report dated Sep. 2, 2021 for PCT/AT2021/060181 (w_English_translation).

*Primary Examiner* — Aaron M Dunwoody
(74) *Attorney, Agent, or Firm* — FisherBroyles, LLP

(57) ABSTRACT

The disclosure relates to a plug connector and method for connecting pipes for liquid or gaseous media. The plug connector includes a connector body and a locking element. An indicator element is formed, which has an indicator surface, a first partial section and a second partial section, wherein the first partial section and the second partial section are flexibly coupled to one another by means of a spring section. The first partial section is connected to the locking element, and the indicator surface is formed on the second partial section, wherein the indicator element is formed such that, in a locking position of the locking element, the second partial section is deformed relative to the first partial section, so that the indicator surface is pushed into an indicator position.

20 Claims, 6 Drawing Sheets

(58) Field of Classification Search
CPC ... F16L 37/144; F16L 37/0841; F16L 37/088; F16L 37/0885; F16L 2201/10
See application file for complete search history.

(56) References Cited

U.S. PATENT DOCUMENTS

| | | |
|---|---|---|
| 10,550,982 B2 | 2/2020 | Pepe |
| 2017/0284583 A1 | 10/2017 | Eckard et al. |
| 2019/0040984 A1* | 2/2019 | Nakashima ......... F16L 37/1225 |
| 2019/0242508 A1 | 8/2019 | Gaurat |
| 2020/0003350 A1 | 1/2020 | Kreider |
| 2020/0149670 A1 | 5/2020 | Wehrmann |

FOREIGN PATENT DOCUMENTS

| | | |
|---|---|---|
| EP | 3179148 A1 | 6/2017 |
| EP | 3587885 A1 | 1/2020 |
| FR | 2927134 A1 | 8/2009 |
| JP | H10047573 A | 2/1998 |
| WO | 2006099933 A1 | 9/2006 |
| WO | 2018102213 A1 | 6/2018 |
| WO | 2018144902 A1 | 8/2018 |
| WO | 2019036233 A1 | 2/2019 |

* cited by examiner

PLUG-IN CONNECTOR FOR CONNECTING PIPES FOR LIQUID OR GASEOUS MEDIA

CROSS-REFERENCE TO RELATED APPLICATIONS

This application claims priority to International Patent Application No. PCT/AT2021/060181, filed on May 27, 2021, and Austrian Patent Application No. A50461/2020, filed on May 27, 2020, the contents of which are hereby incorporated by reference in their entirety.

TECHNICAL FIELD

This disclosure relates to a plug connector for connecting pipes for liquid or gaseous media, as well as a method for establishing a plug connection between the plug connector and a mating plug connector.

BACKGROUND

A variety of plug connectors are known from WO 2018/144902 A1, WO 2018/102213 A1, and EP 3 179 148 A1. The plug connectors known from these documents have the disadvantage that it cannot be determined clearly whether the plug connectors are correctly joined together.

OVERVIEW

The object of the present disclosure was to overcome the shortcomings of the prior art and to provide a plug connector and a method for establishing a plug connection between the plug connector and a mating plug connector, which improve the controllability of the correct connection.

This object is achieved by means of a device and a method according to the claims.

According to the disclosure, a plug connector for connecting pipes for liquid or gaseous media is formed. The plug connector may comprise:
- a connector body, which has at least a first casing section, which forms a receiving space for receiving a part of a mating plug connector, wherein at least two passages are formed in the first casing section;
- one locking element, which is provided for securing the plug connector relative to the mating plug connector, wherein the passages in the connector body serve to receive the locking element. Furthermore, an indicator element is formed, which has an indicator surface, wherein the indicator element has a first partial section and a second partial section, wherein the first partial section and the second partial section are flexibly coupled to one another by means of a spring section, wherein the first partial section is fixedly connected to the locking element, and the indicator surface is formed on the second partial section, wherein the indicator element is formed such that, in a locking position of the locking element and simultaneous correct positioning of the mating plug connector, the second partial section is deformed relative to the first partial section, such that the indicator surface is pushed into an indicator position.

The plug connector according to the disclosure entails the advantage that, due to the design according to the disclosure of the indicator element, it can be clearly identified whether the plug connector is plugged into the mating plug connector correctly and whether the locking element is locked correctly.

Moreover, it may be useful if, in the locking position, the locking element engages with a securing groove of the mating plug connector, wherein the second partial section of the indicator element is formed such that it abuts an outer region of the securing groove, so that the indicator surface is urged into the indicator position, when all latching regions of the locking element engage with the securing groove of the mating plug connector. This entails the advantage that the correct locking of the locking element can be indicated simply and securely.

Furthermore, it may be provided that a contact lug is formed on the second partial section of the indicator element, which contact lug serves to contact the outer region of the securing groove. By means of such a contact lug, the second partial section of the indicator element can be securely urged into its indicator position.

Moreover, it may be provided that an indicator element width of the indicator element is greater in the region of the contact lug than a groove width of the securing groove, or that the indicator element is arranged offset to the securing groove in the region of the contact lug. By means of this measure, it can be achieved that the second partial section of the indicator element cannot be introduced into the securing groove, whereby a correct displacement of the second partial section of the indicator element into the indicator position can be achieved.

An embodiment, according to which it may be provided that the first partial section of the indicator element is received on a first longitudinal end of the locking element, is also advantageous. By this measure, an easy receiving of the indicator element on the locking element can be achieved.

According to an advancement, it is possible that a 90° piece is formed on the first longitudinal end of the locking element, wherein the first partial section of the indicator element has a receiving bore, which serves to receive the 90° piece, and wherein the first partial section of the indicator element has a receiving groove, which serves to receive a first limb of the locking element. By this measure, an easy receiving of the indicator element on the locking element can be achieved.

Moreover, it may be useful if the indicator element has a coding surface, which is visible in the indicator position of the indicator element and, in the rest position of the indicator element, is at least partially concealed, wherein the coding surface has a machine-readable code, such as a data matrix code. By this measure, it can be achieved that not only an optical check of the correct positioning can be carried out by the machine operator but that also a machine-readable check can be carried out and/or that the information can be stored accordingly.

Moreover, it is also conceivable that the information of the machine-readable check is stored and used for enabling and/or preventing further production steps. Hence, it can be achieved that an operator error can be largely precluded.

The indicator surface may simultaneously serve as a coding surface. Hence, the machine-readable code can be arranged directly on the indicator surface.

In particular, it may be advantageous if the indicator surface is designed, at least in some regions, to have a corresponding signal color, such as green, and/or that a lettering, such as "OK", is arranged on the indicator surface. By these measures, it can be achieved that even a person not proficient and/or not trained is able to visually identify a correct locking lug of the locking element and/or a correct joining of the mating plug connector and the plug connector.

Furthermore, it may be provided that the spring section has a taper. The formation of a taper in the spring section entails the advantage that the indicator element is formed to be flexible exactly in the region of the taper, and thus, the first partial section can be bent flexibly relative to the second partial section. By forming the spring section, the original orientation of the first partial section and the second partial section relative to one another can be restored after the application of force to the second partial section has come to an end.

Moreover, it may be provided that the indicator element is formed as an integral injection-molded part. This entails the advantage that the indicator element can be produced in an industrial mass production in a simple manner and with sufficiently high precision.

According to the disclosure, a method for establishing a plug connection between a plug connector for connecting pipes for liquid or gaseous media and a mating plug connector is provided. The method may comprise the following method steps:
- providing the plug connector with a connector body, which has at least a first casing section, which forms a receiving space for receiving a part of the mating plug connector, wherein at least two passages are formed in the first casing section, and a locking element, which is provided for securing the plug connector relative to the mating plug connector, wherein the passages in the first casing section of the connector body serve to receive the locking element;
- providing the mating plug connector;
- plugging the mating plug connector into the receiving space of the plug connector;
- securing the mating plug connector in the plug connector by means of the locking element.

Furthermore, an indicator element is formed, which has an indicator surface, wherein the indicator element has a first partial section and a second partial section, wherein the first partial section and the second partial section are flexibly coupled to one another by means of a spring section, wherein the first partial section is fixedly connected to the locking element, and the indicator surface is formed on the second partial section, wherein, upon latching of the locking element in a locking position, the second partial section of the indicator element is deformed relative to the first partial section of the indicator element, so that the indicator surface is pushed into an indicator position.

The method according to the disclosure entails the advantage that it can be clearly identified whether the plug connector is plugged into the mating plug connector correctly and whether the locking element is locked correctly.

For the purpose of better understanding of the disclosure, it will be elucidated in more detail by means of the figures below.

BRIEF DESCRIPTION OF THE DRAWINGS

These show in a respectively very simplified schematic representation:

FIG. 5 shows a cross-sectional view of the plug assembly with a mating plug connector plugged in;

FIG. 7 shows a lateral view of the plug assembly with a mating plug connector plugged in.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
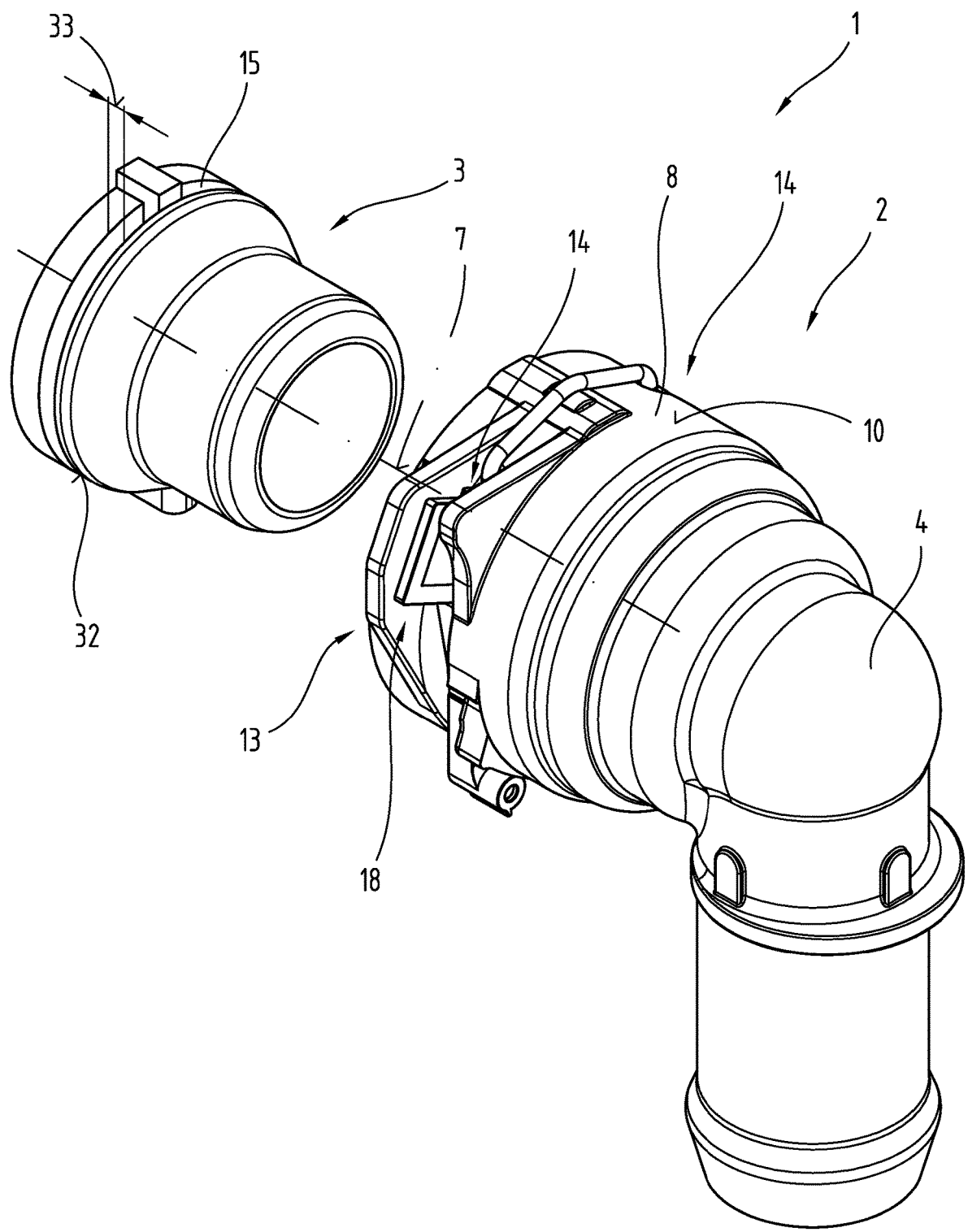
FIG. 1 shows a perspective view of a plug assembly with a plug connector and a mating plug connector arranged spaced apart therefrom.

FIG. 1 shows a perspective view of a plug assembly 1 with a plug connector 2. FIG. 1 further schematically represents a mating plug connector 3, which can be connected to the plug assembly 1. In the view according to FIG. 1, the mating plug connector 3 is not plugged into the plug connector 2. The cooperation between the plug assembly 1 and a mating plug connector 3 is sufficiently described in AT 509 196 B1.

Moreover, a tube 4 is schematically shown, to which the plug connector 2 may be coupled. The tube 4 may, for example, be a rigid element, such as a plastic tube. In a different embodiment variant, the tube 4 may be formed as a flexible pipe made of a rubber material.

The plug connector 2 comprises a connector body 5, which is preferably formed as an injection-molded part, in particular from a plastic material.

As can be seen from FIG. 1, it may be provided that the tube 4 is formed integrally on the connector body 5.

The plug assembly 1 is preferably used in a vehicle, in particular in a road-bound power-driven vehicle having a combustion engine, such as a car or a truck.

Of course, it is also conceivable that the plug assembly 1 is used in any other application, in particular another application in a combustion engine. This may, for example, be the use of the plug assembly 1 in a stationary aggregate, in a marine engine, in aircraft engine, in a construction machine, and so one.

In particular, the plug assembly 1 may be used for connecting different components of the fresh air supply means to the combustion engine. It can for example be provided that the plug connector 2 with the corresponding mating plug connector 3 is provided for connecting two parts in the intake area of a turbocharger. It can further also be provided, for example, that such a plug assembly 1 is used for connecting two components on the pressure side leaving the turbocharger. Moreover, it is also conceivable that the plug assembly 1 is used in water-bearing components, such as coolant hoses, in particular in a combustion engine.

As can further be seen in FIG. 1, it is provided that a locking element 6 is provided for securing the plug connector 2 and the mating plug connector 3 relative to one another.

The locking element 6 is constructed such that it can easily be activated and deactivated such that the plug connector 2 and the mating plug connector 3 can be separated from one another and/or connected to one another as needed.

Figure 2:
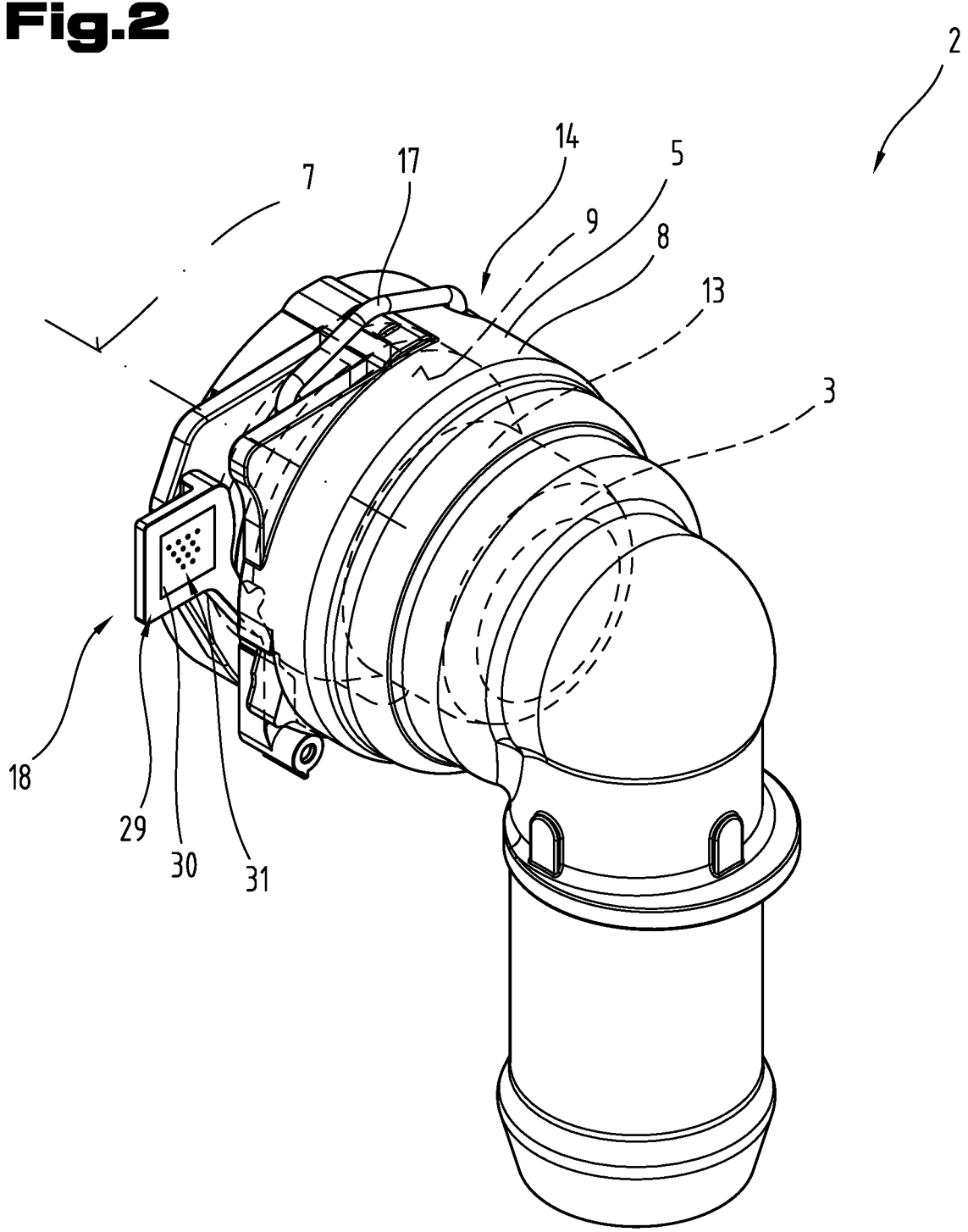
FIG. 2 shows a perspective view of the plug assembly with the plug connector, wherein the mating plug connector is received in the plug connector.

FIG. 2 shows a further perspective view of the plug assembly 1, wherein the mating plug connector 3 is plugged into the plug connector 2 in the representation according to FIG. 2.

As can be seen from FIG. 2, the locking element 6 may be brought into a latching position, in which the plug connector 2 and the mating plug connector 3 are secured relative to one another.

Moreover, the locking element 6 may be brought into a release position, in which the mating plug connector 3 can be inserted into the plug connector 2 or removed therefrom. In particular, it may be provided that the locking element 6 is designed in the form of a spring element.

As can be seen in FIG. 1, it may be provided that the mating plug connector 3 can be plugged into the plug connector 2 along a longitudinal axis of the same.

As can be seen from FIG. 1, a first casing section 8, which surrounds the central longitudinal axis 7 of the plug connector 2 in a sleeve-shape, is formed on the connector body 5. In other words, the first casing section 8 can be a rotationally symmetrical hollow cylinder.

The first casing section 8 comprises an inner casing face 9 and an outer casing face 10.

In the region of the first casing section 8, the plug connector 2 has a receiving space 13. The receiving space 13 is surrounded by the first casing section 8 and serves to receive a part of the mating plug connector 3.

The connector body 5 has multiple passages 14 spaced apart from one another in the circumferential direction, which penetrate the first casing section 8. In the latching position of the locking element 6, which it assumes in the plugged in and locked state, the locking element 6 projects through the corresponding passage 14 into the receiving space 13. In this regard, the locking element 6 cooperates with a securing groove 15 of the mating plug connector 3. In particular, in the latching position of the locking element 6, the locking element 6 protrudes through the passages 14 into the securing groove 15 of the mating plug connector 3.

In addition to this, it may be provided that the locking element 6 has a holding region 17, by which it can be gripped so it can be inserted into the connector body 5 and so it can be moved between the latching position and the release position.

When the locking element 6 is in its latching position, the latching regions 16 project into the receiving space 13 and the mating plug connector 3 is axially secured relative to the plug connector 2. In particular, it is provided here that the latching regions 16 of the locking element 6 protrude through the passages 14 into the securing groove 15 of the mating plug connector 3. When the locking element 6 is in its release position, the latching regions 16 do not project into the receiving space 13 and the mating plug connector 3 is axially displaceable relative to the plug connector 2.

Figure 3:
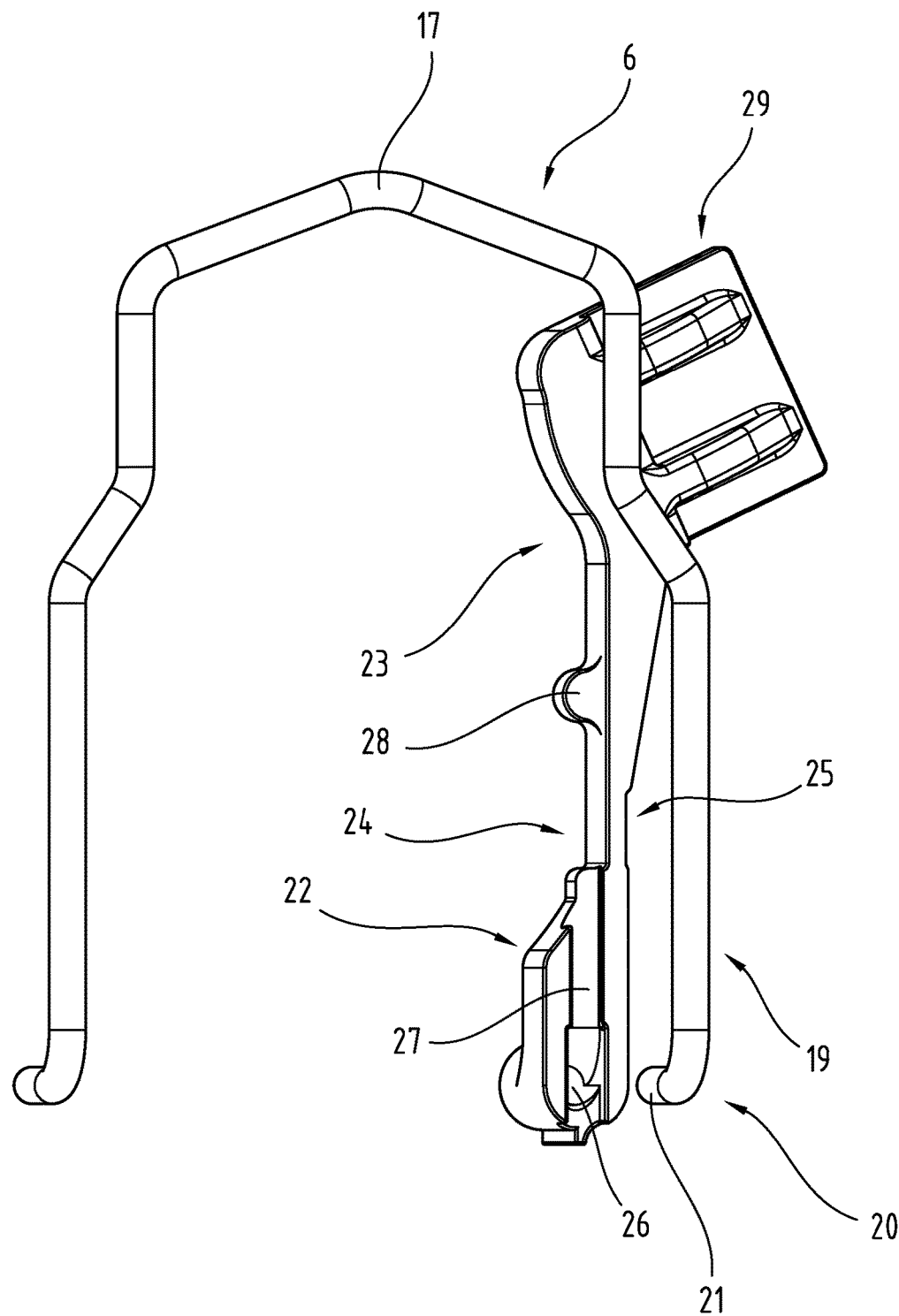
FIG. 3 shows a perspective view of a locking element and an indicator element.

FIG. 3 shows a perspective view of the locking element 6 and an indicator element 18 to be fastened to the locking element 6, which indicator element 18 serves to signal whether the locking element 6 is locked correctly.

As can be seen in FIG. 3, it may be provided that the locking element 6 has a first limb 19, wherein a 90° piece 21 is arranged on a first longitudinal end 20 of the first limb 19.

As can further be seen from FIG. 3, it may be provided that the indicator element 18 has a first partial section 22 and a second partial section 23, wherein a spring section 24 is formed between the first partial section 22 and the second partial section 23.

In particular, it may be provided that the spring section 24 has a taper 25 in the cross-section.

Due to the spring section 24, the first partial section 22 and the second partial section 23 are movable and/or tiltable relative to one another. Due to the relative movability of the first partial section 22 and the second partial section 23 relative to one another, an indication of the correct locking of the locking element 6 can be achieved.

As can further be seen in FIG. 3, it may be provided that the first partial section 22 of the indicator element 18 has a receiving bore 26, which serves to receive the 90° piece 21 of the locking element 6. In particular, the 90° piece 21 of the locking element 6 can be plugged into the receiving bore 26 in order to be able to couple the indicator element 18 to the locking element 6.

As can further be seen in FIG. 3, it may be provided that the first partial section 22 of the indicator element 18 has a receiving groove 27, which serves to receive the first limb 19 of the locking element 6. In particular, the part of the first limb 19 directly adjacent to the 90° piece 21 is received in the receiving groove 27. Due to the receiving bore 26 and the receiving groove 27, it can be achieved that the first partial section 22 of the indicator element 18 is coupled to the first limb 19 of the locking element 6 in a rotationally secure manner.

Moreover, it may be provided that a contact lug 28 is formed on the second partial section 23 of the indicator element 18, which contact lug 28 serves to activate the indicator element 18.

As can be seen in FIG. 3, an indicator surface 29 is formed on the indicator element 18, wherein FIG. 3 shows the rear side of the indicator surface 29. In FIG. 2, the indicator surface 29 can be seen from its front side.

As can further be seen in FIG. 2, it may be provided that the indicator surface 29 of the indicator element 18 simultaneously serves as a coding surface 30 on which a code 31 is arranged.

The indicator surface 29 may have a signal color, such as a green color, in order to be able to signal that the locking element 6 is locked correctly. As an alternative or in addition thereto, it is also conceivable that a lettering is arranged on the indicator surface 29, or that the indicator surface 29 is perforated accordingly by a lettering, which also signals the correct locking of the locking element 6.

In the representation according to FIG. 2, the indicator element 18 is in an indicator position, which signals that the mating plug connector 3 is plugged into the plug connector 2 correctly.

In the representation according to FIG. 1, the indicator element 18 is in a rest position, which signals that the mating plug connector 3 is plugged into the plug connector 2 either not at all or not correctly.

The functionality of the indicator element 18 and/or the transition from the rest position into the indicator position of the indicator element 18 is explained in more detail with the aid of FIGS. 4 to 7.

Figure 4:
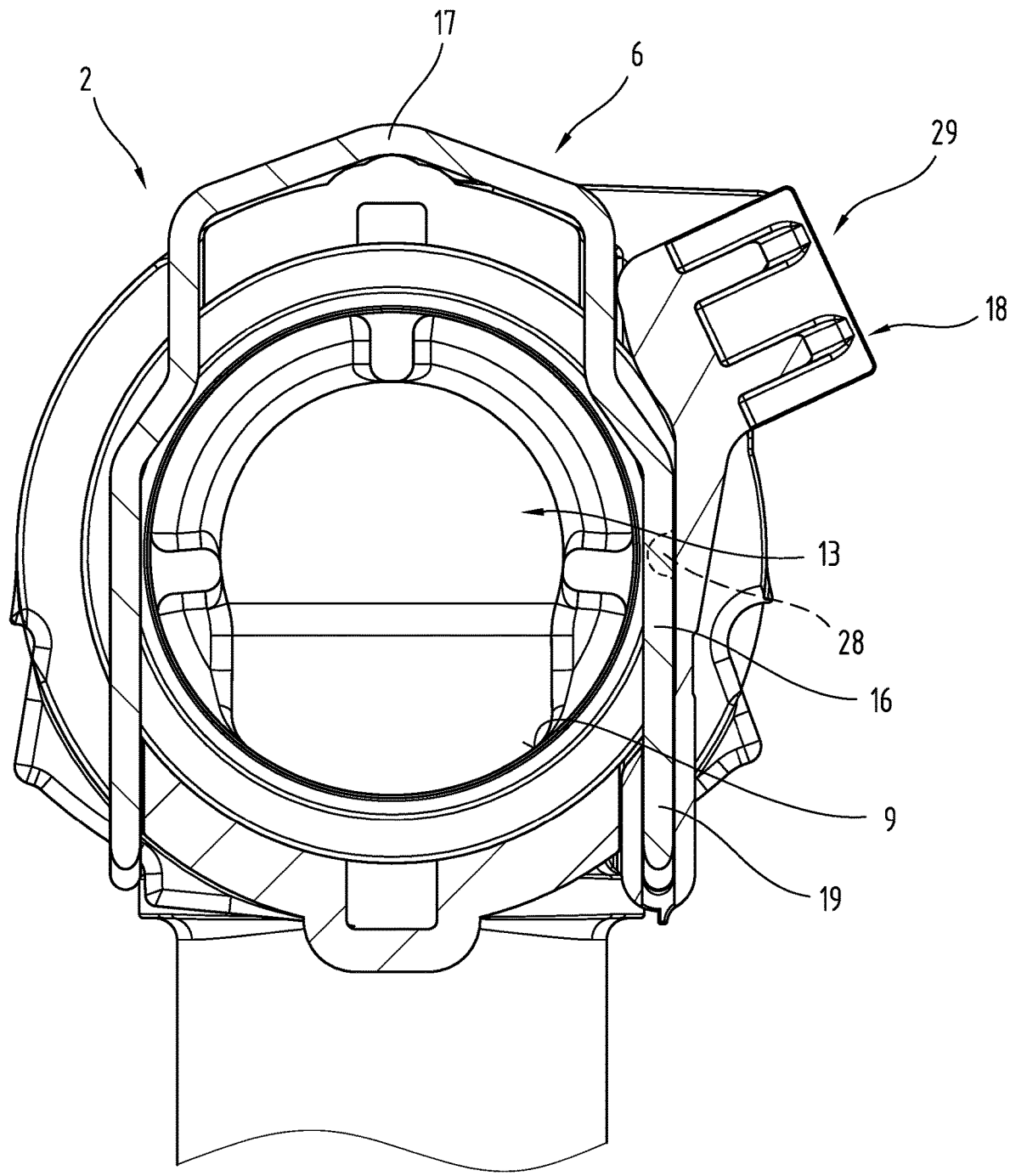
FIG. 4 shows a cross-sectional view of the plug assembly without a mating plug connector.

FIG. 4 shows a cross-sectional view of the plug connector 2, wherein the indicator element 18 is in its rest position.

Figure 5:
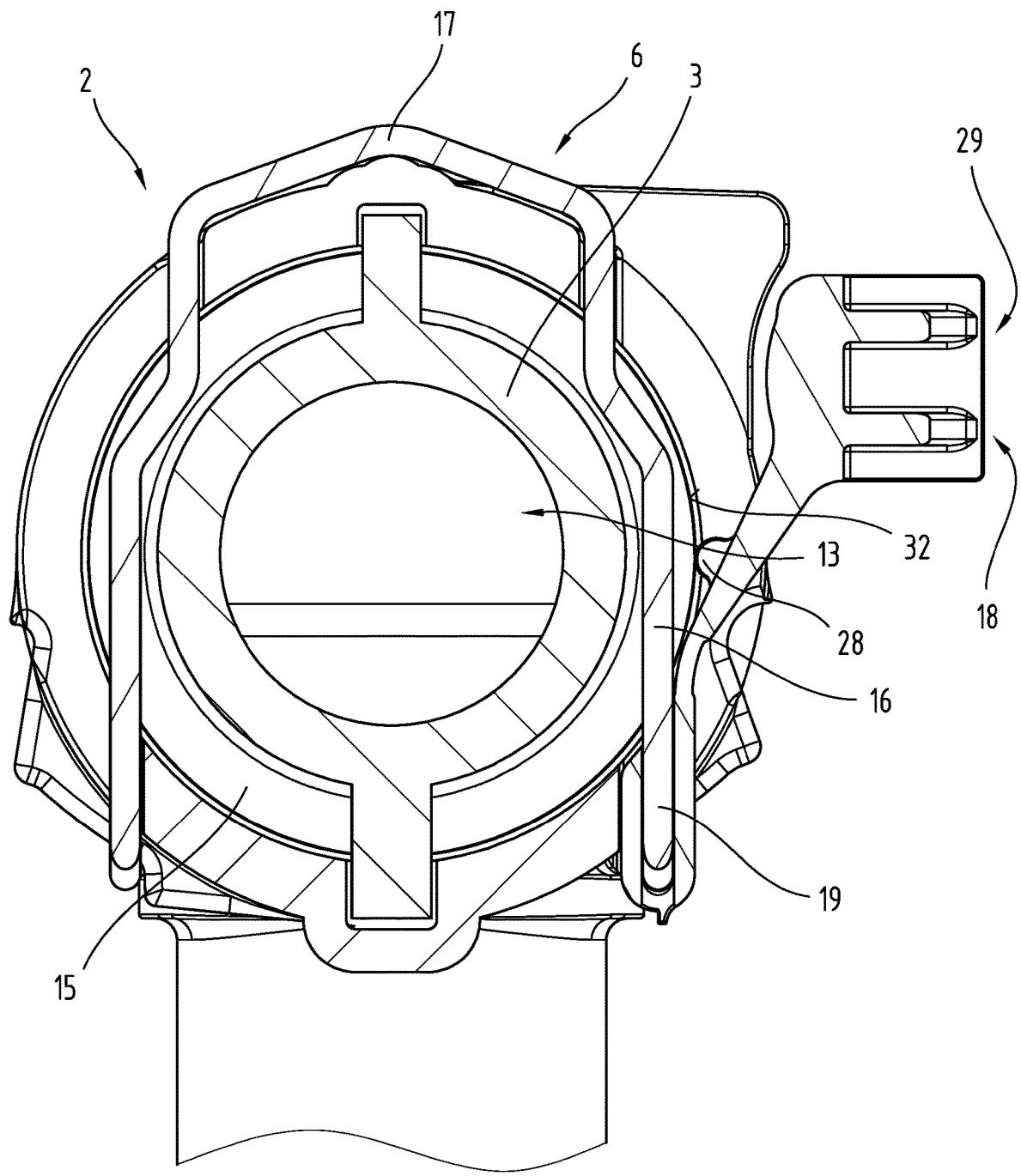

FIG. 5 shows a cross-sectional view of the plug connector 2 with the mating plug connector plugged in, wherein the indicator element 18 is in its indicator position.

Figure 6:
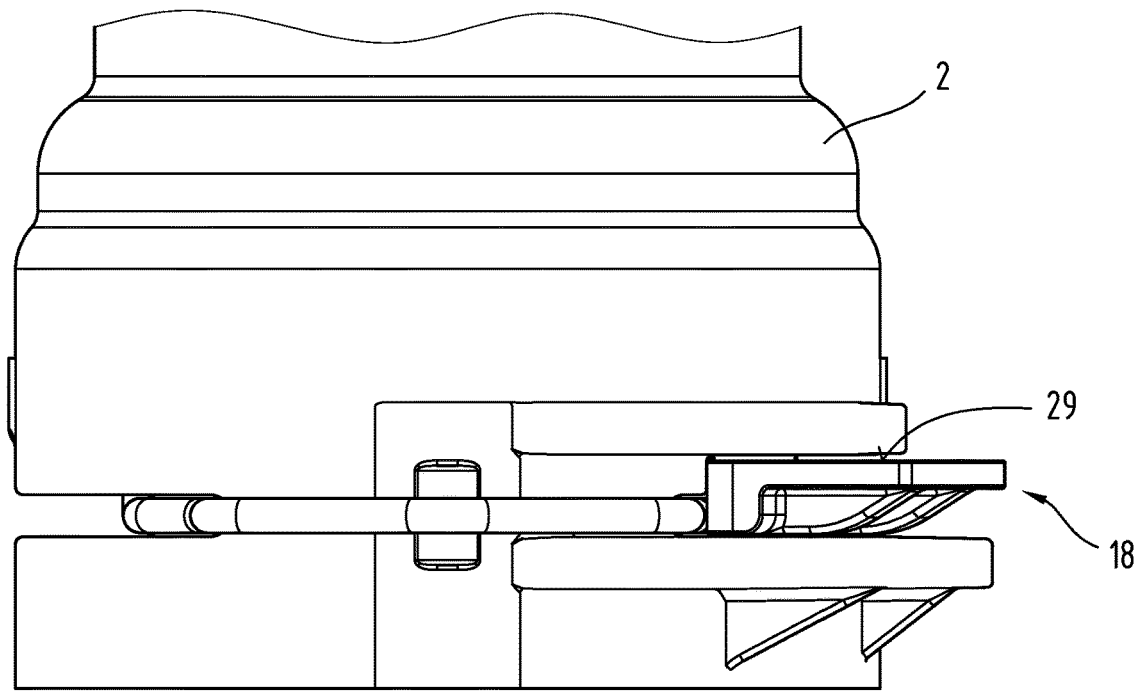
FIG. 6 shows a lateral view of the plug assembly without a mating plug connector.

FIG. 6 shows a lateral view of the plug connector 2, wherein the indicator element 18 is in its rest position.

Figure 7:
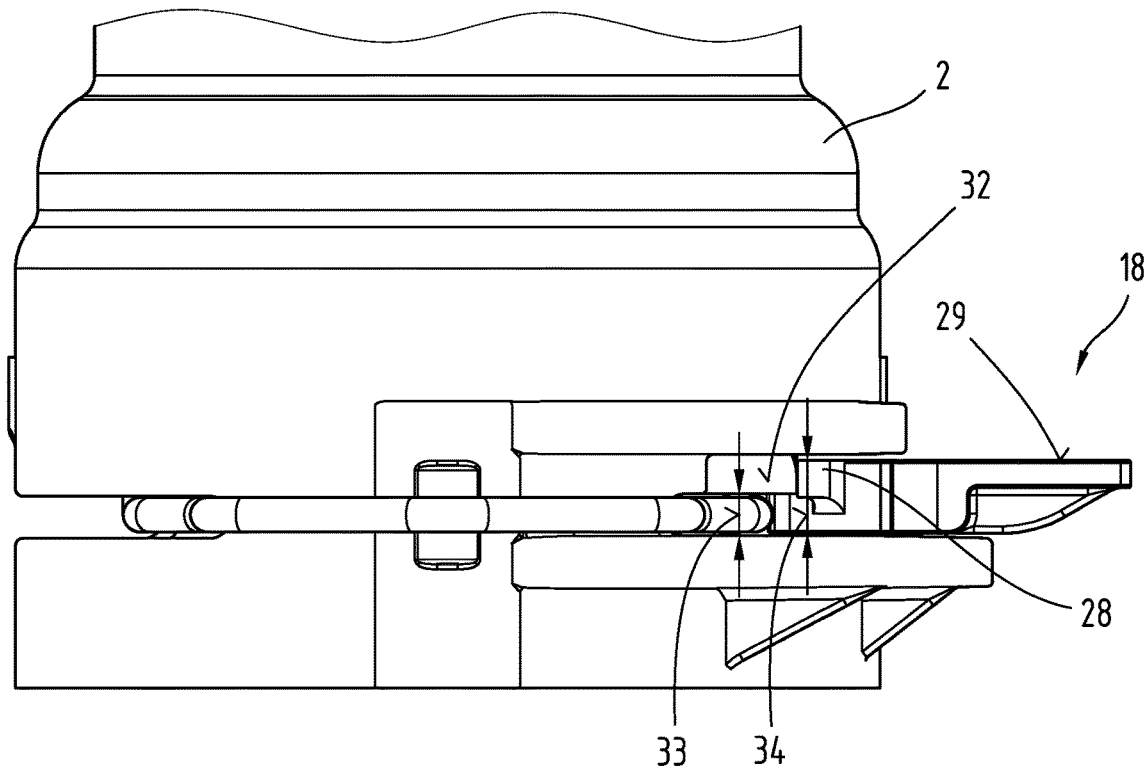

FIG. 7 shows a lateral view of the plug connector 2 with the mating plug connector plugged in, wherein the indicator element 18 is in its indicator position.

As can be seen in FIGS. 4 and 6, the indicator element 18 is in its rest position when the mating plug connector 3 is not yet plugged into the plug connector 2.

During assembly, the mating plug connector 3 is then plugged into the plug connector 2. In order to axially secure the mating plug connector 3 in the plug connector 2, the locking element 6 is introduced into the securing groove 15. When correctly introducing the locking element 6 into the securing groove 15, a part of the indicator element 18, in particular the contact lug 28, abuts an outer region 32 of the mating plug connector 3, whereby the second partial section 23 of the indicator element 18 is pushed outwards relative to the first partial section 22 of the indicator element 18, and thereby, the indicator surface 29 of the indicator element 18 is pushed into an indicator position. In the indicator position of the indicator element 18, the indicator surface 29 is visible from outside, whereby a correct latching of the locking element 6 is signaled.

In order to achieve this function, it may be provided that an indicator element width 34 of the indicator element 18 is greater in the region of the contact lug 28 than a groove width 33 of the securing groove 15. Thereby, the indicator element 18 is pushed into an indicator position.

Alternatively, the function can also be achieved when the indicator element 18 is arranged offset to the securing groove 15 in the region of the contact lug 28.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | Plug assembly |
| 2 | Plug connector |
| 3 | Mating plug connector |
| 4 | Tube |
| 5 | Connector body |
| 6 | Locking element |

| List of reference numbers -continued | |
|---|---|
| 7 | Longitudinal axis of the plug connector |
| 8 | First casing section |
| 9 | Inner casing face |
| 10 | Outer casing face |
| 11 | Seal receptacle of plug connector |
| 12 | Annulus |
| 13 | Receiving space |
| 14 | Passage |
| 15 | Securing groove |
| 16 | Latching region |
| 17 | Holding region |
| 18 | Indicator element |
| 19 | First limb |
| 20 | First longitudinal end locking element |
| 21 | 90° piece |
| 22 | First partial section |
| 23 | Second partial section |
| 24 | Spring section |
| 25 | Taper |
| 26 | Receiving bore |
| 27 | Receiving groove |
| 28 | Contact lug |
| 29 | Indicator surface |
| 30 | Coding surface |
| 31 | Code |
| 32 | Outer region |
| 33 | Groove width |
| 34 | Indicator element width |

The invention claimed is:

1. A plug connector for connecting pipes for liquid or gaseous media, comprising:
a connector body, which has at least a first casing section, which forms a receiving space for receiving a part of the mating plug connector, wherein at least two passages are formed in the first casing section; and
a locking element, which is provided for securing the plug connector relative to the mating plug connector, wherein the passages in the connector body serve to receive the locking element,
wherein an indicator element is configured, which has an indicator surface, wherein the indicator element has a first partial section and a second partial section, wherein the first partial section and the second partial section are flexibly coupled to one another by means of a spring section, wherein the first partial section is fixedly connected to the locking element, and the indicator surface is part of the second partial section, wherein the indicator element is formed such that, in a locking position of the locking element and simultaneous correct positioning of the mating plug connector, the second partial section is deformed relative to the first partial section, so that the indicator surface is pushed into an indicator position,
wherein when in the locking position, the locking element engages with a securing groove of the mating plug connector.

2. The plug connector according to claim 1, wherein the second partial section of the indicator element is configured such that the second partial section abuts an outer region of the securing groove, so that the indicator surface is urged into the indicator position, when all latching regions of the locking element engage with the securing groove of the mating plug connector.

3. The plug connector according to claim 2, wherein a contact lug is formed on the second partial section of the indicator element, which contact lug serves to contact the outer region of the securing groove.

4. The plug connector according to claim 3, wherein an indicator element width of the indicator element is greater in a region of the contact lug than a groove width of the securing groove, or that the indicator element is arranged offset to the securing groove in the region of the contact lug.

5. The plug connector according to claim 1, the first partial section of the indicator element is received at a first longitudinal end of the locking element.

6. The plug connector according to claim 5, wherein a 90° piece is formed on the first longitudinal end of the locking element, wherein the first partial section of the indicator element has a receiving bore, which is operable to receive the 90° piece, and wherein the first partial section of the indicator element has a receiving groove, which serves to receive a first limb of the locking element.

7. The plug connector according to claim 1, wherein the indicator element has a coding surface, which is visible in the indicator position of the indicator element and, in a rest position of the indicator element, is at least partially concealed, wherein the coding surface has a machine-readable code.

8. The plug connector according to claim 1, wherein the spring section has a taper.

9. The plug connector according to claim 1, wherein the indicator element is formed as an integral injection-molded part.

10. A method for establishing a plug connection between a plug connector for connecting pipes for liquid or gaseous media and a mating plug connector, comprising the steps:
providing the plug connector with a connector body, which has at least one first casing section, which forms a receiving space for receiving a part of the mating plug connector, wherein at least two passages are formed in the first casing section, and a locking element, which is provided for securing the plug connector relative to the mating plug connector, wherein the passages in the first casing section of the connector body serve to receive the locking element;
providing the mating plug connector;
plugging the mating plug connector into the receiving space of the plug connector;
securing the mating plug connector in the receiving space of the plug connector by means of the locking element, wherein
an indicator element has an indicator surface, wherein the indicator element has a first partial section and a second partial section, wherein the first partial section and the second partial section are flexibly coupled to one another by means of a spring section, wherein the first partial section is fixedly connected to the locking element, and the indicator surface is formed on the second partial section, wherein, when the locking element latches in a locking position, the second partial section of the indicator element is deformed relative to the first partial section of the indicator element, so that the indicator surface is pushed into an indicator position,
wherein when in the locking position, the locking element engages with a securing groove of the mating plug connector.

11. The method for establishing a plug connection as claimed in claim 10, wherein the indicator surface is operable to be moved to a rest position.

12. The method for establishing a plug connection as claimed in claim 10, wherein the indicator element includes a coding surface having at least one of a signal color, a coding surface, or a code.

13. The method for establishing a plug connection as claimed in claim 10, wherein the first partial section includes a receiving bore, and the locking element includes a first end that is configured to fit within the receiving bore.

14. The method for establishing a plug connection as claimed in claim 10, wherein a plug assembly is created that can be used with a vehicle, marine engine, aircraft or construction machine.

15. The method for establishing a plug connection as claimed in claim 10, wherein the locking element can be activated and deactivated to signal when the plug connector and mating plug connector are separated.

16. A plug connector for connecting pipes for liquid or gaseous media, comprising:
a connector body having a first casing section which forms a receiving space for receiving a part of the mating plug connector, wherein at least one passage is formed in the first casing section;
a locking element configured to secure the plug connector to the mating plug connector, wherein the passage serves to receive the locking element; and
an indicator element having an indicator surface, a first partial section and a second partial section, the first partial and second partial sections are flexibly coupled to one another by a spring section, wherein the first partial section is pivotably connected to the locking element,
wherein when the locking element latches in a locking position, the locking element engages with a securing groove of the mating plug connector.

17. The plug connector as claimed in claim 16, wherein the indicator element is configured to move from a locking position to an unlocked position.

18. The plug connector as claimed in claim 16, wherein the locking element has a first limb and a second limb, and a holding region between the first and second limbs.

19. The plug connector as claimed in claim 16, further comprising a contact lug positioned between the first partial section and the second partial section.

20. The plug connector as claimed in claim 16, wherein the plug connector is configured to be used with one of a vehicle, marine engine, aircraft or construction machine.

* * * * *